S. S. BERKLEY.
SUSPENSION MEANS FOR TROLLEY WIRES.
APPLICATION FILED AUG. 27, 1909.
960,065.
Patented May 31, 1910.
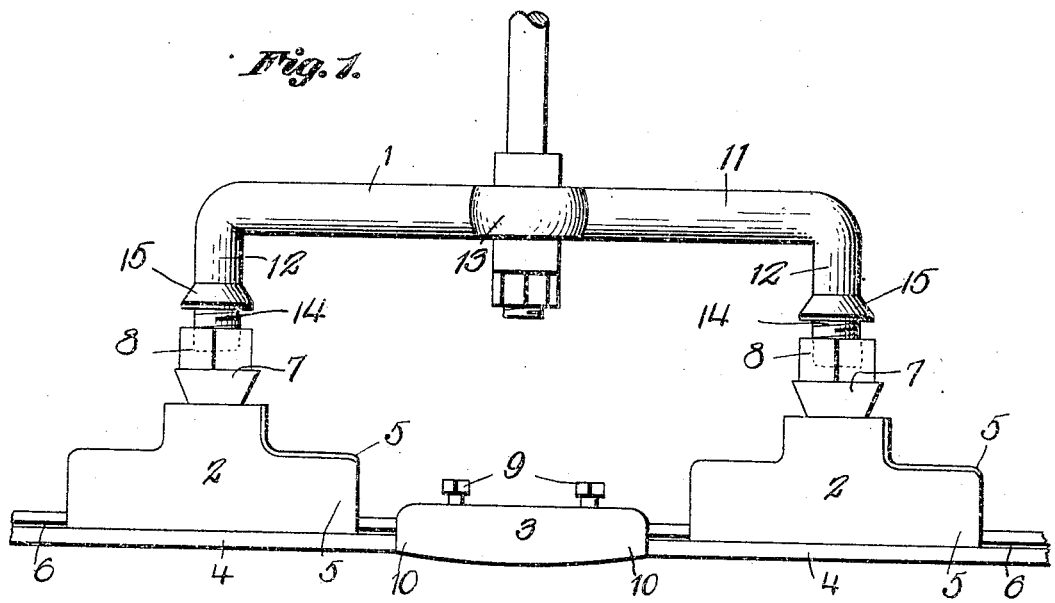
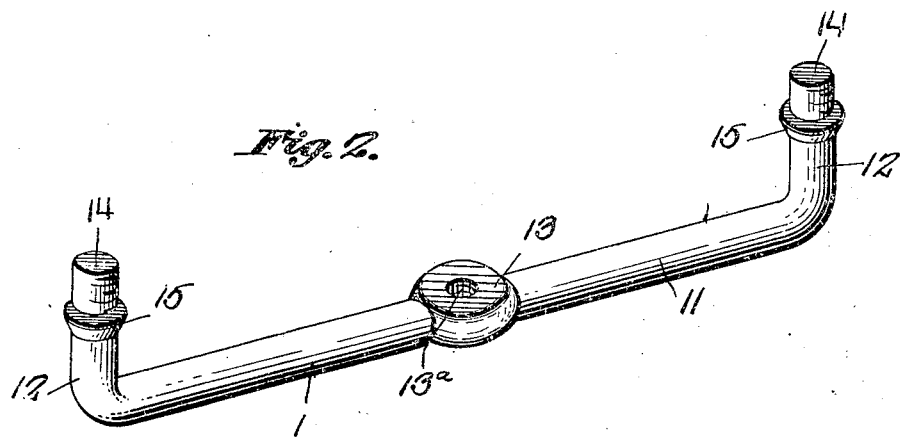
Witnesses
Chas. C. Richardson.
John F. Byrne.
Inventor
Samuel S. Berkley,
By Victor J. Evans
Attorney

UNITED STATES PATENT OFFICE.

SAMUEL S. BERKLEY, OF RALPHTON, PENNSYLVANIA.

SUSPENSION MEANS FOR TROLLEY-WIRES.

960,065.  Specification of Letters Patent.  Patented May 31, 1910.

Application filed August 27, 1909. Serial No. 514,967.

*To all whom it may concern:*

Be it known that I, SAMUEL S. BERKLEY, a citizen of the United States, residing at Ralphton, in the county of Somerset and State of Pennsylvania, have invented new and useful Improvements in Suspension Means for Trolley-Wires, of which the following is a specification.

My invention relates to improvements in suspension means for trolley wires, and it is particularly directed to improvements in means for suspending and splicing the ends of trolley wire sections.

Broadly and generally speaking the invention comprises a hanger, wire clamps adapted to secure the trolley wire sections to the ends of the hanger, and a splice adapted to unite the ends of the trolley wire sections.

One object of the invention is the provision of a trolley wire suspending means of the above stated character wherein the parts are so relatively disposed as to prevent the splice from being moved upwardly under the tension of the trolley wheel thereon, whereby to prevent the accidental separation of the trolley wire sections.

With the above and other objects in view, the invention consists in the construction, combination and arrangement of parts hereinafter fully described and claimed, and illustrated in the accompanying drawing, wherein:—

Figure 1 is a view in side elevation of a trolley wire suspending means constructed in accordance with my invention, and Fig. 2 is a detail perspective view of the hanger of the trolley wire suspension means.

Like reference characters are used to designate similar parts in the several views.

My improved trolley suspension means comprises a hanger 1, wire clamps 2, and a wire splice 3. The hanger is disposed longitudinally of the trolley wire, clamps secure the trolley wire sections 4 to the ends of the hanger, and the splice unites the ends of the trolley wire sections and it is located between the clamps. The disposition of the hanger longitudinally of the trolley wire, and the location of the splice between the clamps, prevents the splice from being moved upwardly under the tension placed thereon by the trolley wheel, whereby to prevent the ends of the trolley wire sections from becoming accidentally separated.

The wire clamps 2 are of a well-known construction, and each consists of a pair of hingedly connected members 5 having clamping edges adapted to engage in the groove 6 of the trolley wire section 4, and an expanding nut 7 threadedly mounted between the members 5. When the expanding nut 7 is turned in one direction the members 5 are moved into and held in active position. When the expanding nut 7 is turned in the reverse direction the members 5 may be moved into inactive position. The expanding nuts 7 are provided with threaded sockets 8 shown in dotted lines in Fig. 1 of the drawing.

The splice 3 is provided with a longitudinally extending bore for the reception of the ends of the trolley wire sections 4, and it is held against movement on the trolley wire sections by set-screws 9. The splice 3 has its ends beveled as at 10 to permit a trolley wheel to ride freely thereover.

The hanger 1 comprises an elongated body 11 provided at its ends with depending arms 12. At a point centrally between its ends the body 11 is enlarged laterally to provide a head 13 which is provided with a threaded opening 13ª for the reception of an attaching element. The lower ends of the arms 12 are formed to provide threaded studs 14 adapted to be received by the sockets 8 of the expanding nut 7. At a point above the studs 14 the arms 12 are formed with reinforcing and stop flanges 15.

The trolley suspension means is especially adapted for use in mines, and when the means is in use the hanger 1 is secured to the ceiling of the drift by means of a bolt threadedly engaging the wall of the opening 13ª. As the wire clamps 2 are secured to the ends of the hanger, the hanger is held against movement on the suspending bolt.

From the foregoing description, taken in connection with the accompanying drawing, it should be apparent that I provide a suspending means which is admirably adapted for the purpose for which it is intended, which is simple, durable and efficient, and which may be manufactured and sold at a comparatively low cost.

Changes in the form, proportions and minor details of construction may be made within the scope of the claims without departing from the spirit or sacrificing any of the advantages of the invention.

Having thus described the invention, what I claim as new is:—

1. The combination with two trolley wire sections, of a hanger disposed longitudinally of the trolley wire sections, clamps secured to the trolley wire sections and to the ends of the hanger, and a splice uniting the ends of the trolley wire sections and disposed between the clamps.

2. A trolley wire suspending means including a hanger comprising an elongated body provided at its ends with depending arms terminating in threaded studs, the body being provided at a point intermediate its ends with an opening having its wall threaded, and stop and reinforcing flanges formed on the arm above the threaded studs.

In testimony whereof I affix my signature in presence of two witnesses.

SAMUEL S. BERKLEY.

Witnesses:
A. O. BAKER,
R. G. SCHUMAKER.